United States Patent [19]

Wesner

[11] Patent Number: 4,777,602

[45] Date of Patent: Oct. 11, 1988

[54] DIGITAL AUTOPILOT CONTROLLER FOR MARINE VESSELS

[75] Inventor: Charles R. Wesner, Crozet, Va.

[73] Assignee: Sperry Marine Inc., Charlettsville, Va.

[21] Appl. No.: 878,556

[22] Filed: Jun. 26, 1986

[51] Int. Cl.[4] .................. G05D 1/02; G06F 15/50
[52] U.S. Cl. .................................... 364/457; 364/447; 318/588; 114/144 RE
[58] Field of Search .............. 364/457, 443, 424, 447; 318/588; 114/144 RE; 377/45; 33/1 PT

[56] References Cited

U.S. PATENT DOCUMENTS

| | | | |
|---|---|---|---|
| 3,746,842 | 7/1973 | Fowler | 364/457 |
| 3,772,503 | 11/1973 | Fowler | 364/457 |
| 3,975,621 | 8/1976 | Fowler | 364/457 |
| 4,071,898 | 1/1978 | Schorsch et al. | 364/457 |
| 4,091,543 | 5/1978 | Lapeyre | 33/356 |
| 4,179,741 | 12/1979 | Rossani | 364/457 |
| 4,374,423 | 2/1983 | Kundler et al. | 364/434 |
| 4,542,464 | 9/1985 | Kramer | 364/457 |

Primary Examiner—Parshotam S. Lall
Assistant Examiner—Thomas G. Black
Attorney, Agent, or Firm—Seymour Levine

[57] ABSTRACT

A heading change unit for a ship's autopilot gyrocompass that provides a heading error signal to produce a proportional rudder control signal. An operator enters a heading change which causes an up/down counter to be incremented or decremented in accordance with the heading change order. The counter is also responsive to a step heading input signal. The count is referenced to a zero value and converted to an analog control signal by a digital-to-analog converter. As the ship turns towards the new heading, the changing step heading input will cause the counter to count back to zero. The displayed amount of heading error or ordered heading change is generated by converting the analog heading error signal to a digital encoded format which controls a display. The heading error signal is generated in the form of a parallel twelve bit binary code which represents integer degree changes and 1/6 degree fractional changes.

4 Claims, 5 Drawing Sheets

| HEADING CHANGE DEGREES | STEP BIT | | | BINARY BIT | | | | |
|---|---|---|---|---|---|---|---|---|
| | C | B | A | 5 | 4 | 3 | 2 | 1 |
| 0 | | | X | 0 | 0 | 0 | 0 | 0 |
| 5/32 | | X | X | 0 | 0 | X | 0 | X |
| 11/32 | | X | | 0 | X | 0 | X | X |
| 16/32 | X | X | | X | 0 | 0 | 0 | 0 |
| 21/32 | X | | | X | 0 | X | 0 | X |
| 27/32 | X | | X | X | X | 0 | X | X |

FIG.4.

$\overline{CE1} = \overline{a} \cdot \overline{b} \cdot \overline{c}$ $A = a \cdot \uparrow CLK_1$ $B = b \cdot \uparrow CLK_1$ $C = c \cdot \uparrow CLK_1$ $C' = C \cdot \uparrow CLK_1$ $U/D = R + \overline{C} \cdot \overline{L}$ $MR = (\overline{L} \cdot \overline{R}) + (L \cdot R)$ $CLK_3 = (\overline{CLK_1} \cdot CE3 \cdot \overline{L} \cdot \overline{R}) + (CLK_2 \cdot CE2)$

FIG.5.

$BIT1 = (AB\overline{C} + \overline{A}B\overline{C} + \overline{A}\overline{B}C + A\overline{B}C) \cdot \uparrow \overline{CLK_1}$ $BIT2 = (\overline{A}B\overline{C} + A\overline{B}C) \cdot \uparrow \overline{CLK_1}$ $BIT3 = (AB\overline{C} + \overline{A}\overline{B}C) \cdot \uparrow \overline{CLK_1}$ $BIT4 = (\overline{A}B\overline{C} + A\overline{B}C) \cdot \uparrow \overline{CLK_1}$ $BIT5 = (\overline{A}BC + \overline{A}\overline{B}C + A\overline{B}C) \cdot \uparrow \overline{CLK_1}$ $\overline{CE2} = (CO1 \cdot Q_1 \cdot Q_2 \cdot Q_3) + (\overline{CO1} \cdot \overline{Q_1} \cdot \overline{Q_2} \cdot \overline{Q_3})$ $CE3 = CE2 \cdot A(C \oplus C')$

FIG.6.

DIGITAL AUTOPILOT CONTROLLER FOR MARINE VESSELS

BACKGROUND OF THE INVENTION

1. Field of the Invention

The invention pertains generally to marine autopilot controllers and more particularly to a digital controller for commanding a change in course heading from a set course and for displaying the heading error.

2. Decription of the Prior Art

Prior art controllers are analog devices in which step data from a gryocompass are applied to a compass repeater with a synchro or potentiometer which is manually positioned with respect to the repeater dial for heading selection to produce a proportional rudder control signal. In shipboard navigation systems it is desirable to provide an auxiliary autopilot controller for use in the case of failure of the main autopilot controller. A problem in designing a controller that would fit in the available space on an existing ship control console is the lack of space to install the necessary analog components. Further, such precision components are expensive and not cost effective for a controller that is to be used only in the case of failure of the main controller.

The present invention utilizes digital electronics components to fit in the available space on an existing ship control console. By utilizing digital electronics, precision accuracy can be obtained at minimal cost and with only moderate space requirements. The use of digital electronics facilitates provision of a digital display for displaying heading error in degrees and fractions of degrees. The operator does not select a heading to steer but selects the number of degrees heading change from a set heading to arrive at and maintain a new heading.

SUMMARY OF THE INVENTION

According to the principles of the present invention, compass signals in raw step data form are applied to a level shifter which transforms the step signal levels to levels suitable for the operation of digital electronics. A logic device, suitably programmed for receiving and processing the changed voltage level signals, responds to commands to change the actual course heading and provides filtered binary output signals corresponding to the preset deviation in course established by the command control. A further logic device receives the filtered binary signals and generates further output signals representative of the magnitude and direction of fractional degree deviations from the set course heading. A pulse counter receives control signals from the first logic element and generates integer degree signals. The integer and fractional degree signals are applied to a digital-to-analog converter whose output is the heading error for an autopilot and is provided to a digital display.

BRIEF DESCRIPTION OF THE DRAWINGS

FIG. 4 is a truth table summarizing a three-bit binary step data code useful for generating fractional degree signals.

FIG. 5 is a table showing the logic design of the counter control array logic.

FIG. 6 is a table showing the logic design of the fractional step encoder array logic device.

DESCRIPTION OF THE PREFERRED EMBODIMENT

Figure 1A:
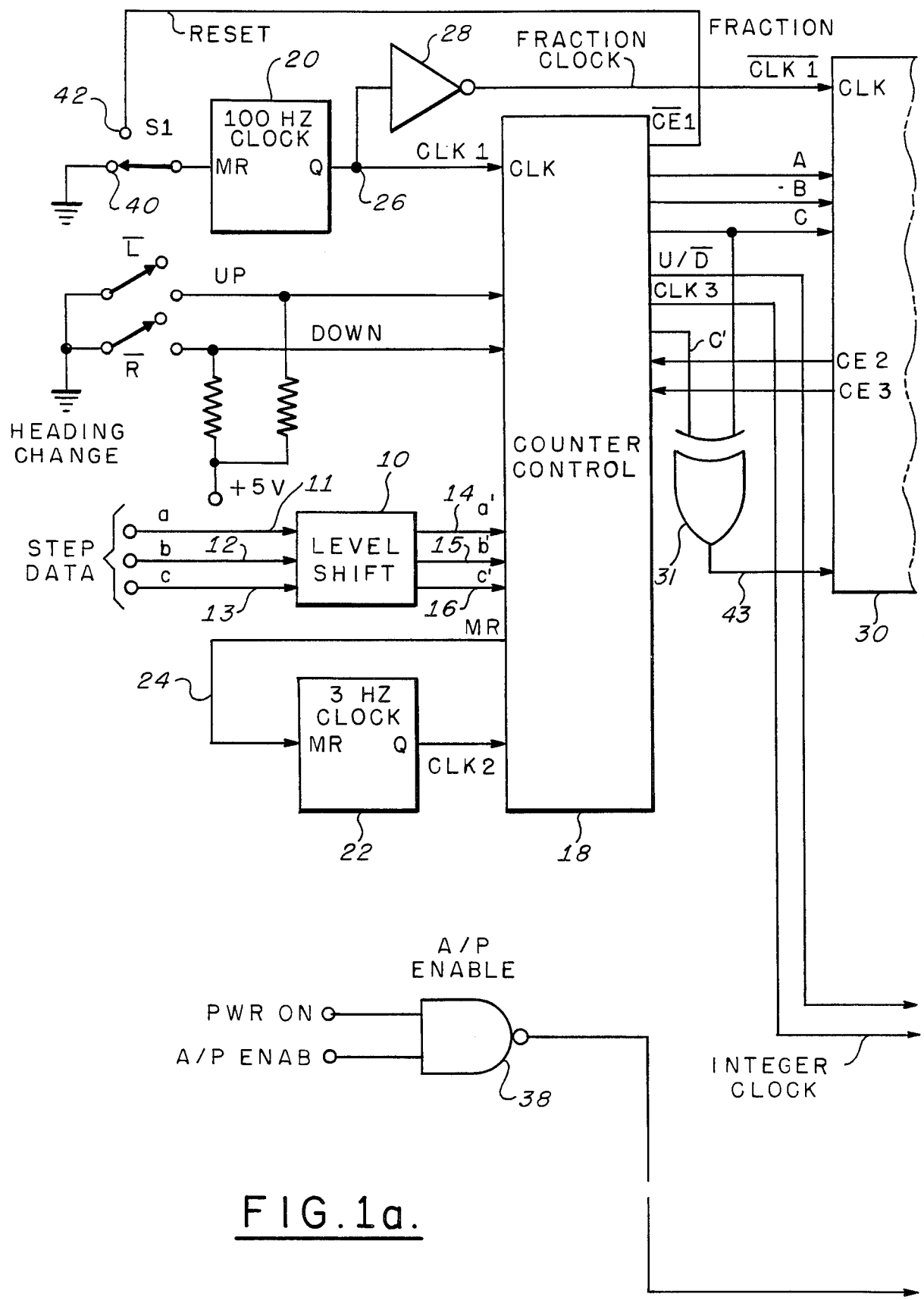
FIGS. 1a and 1b show a block diagram of a preferred embodiment of the invention.
Figure 1B:
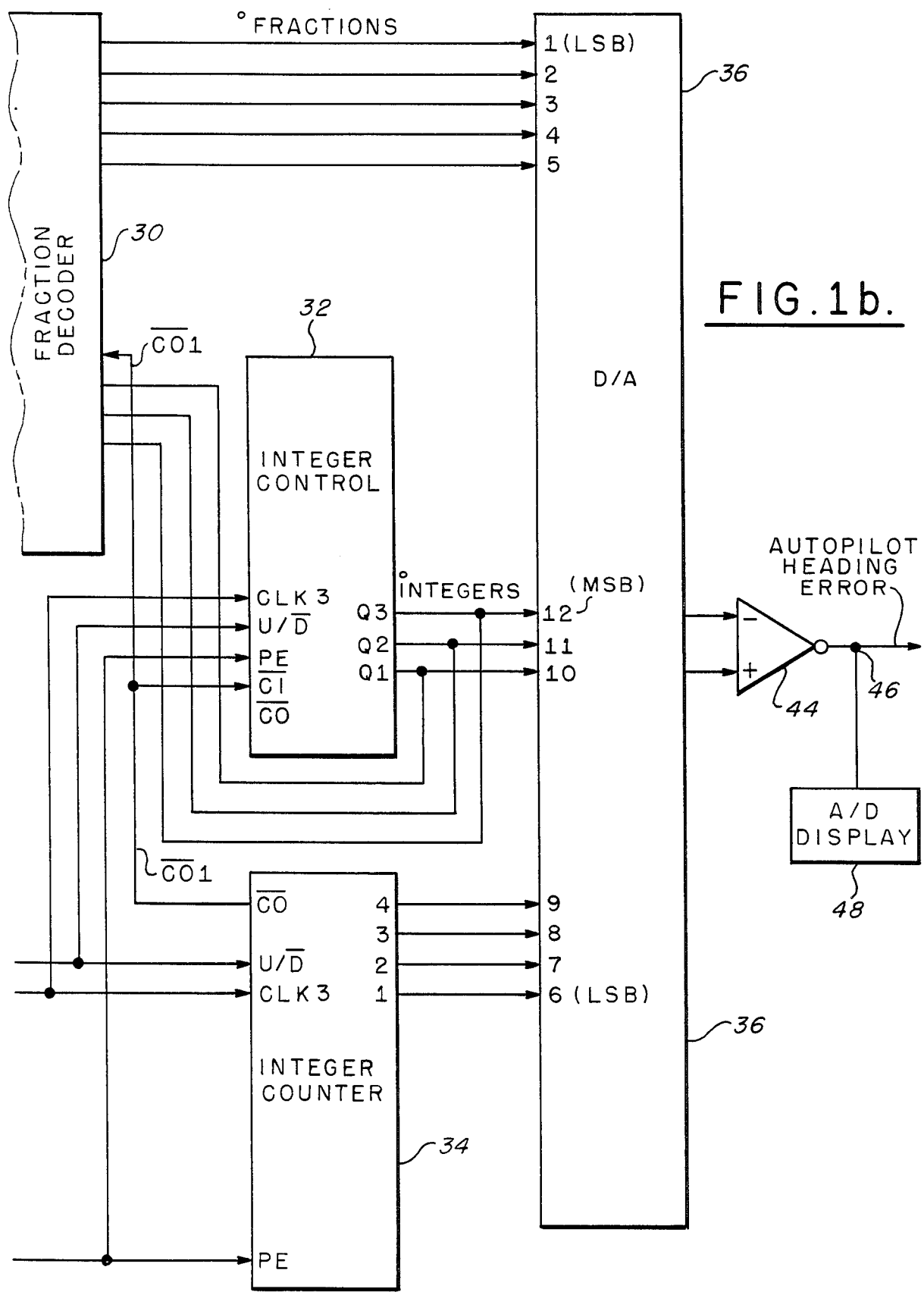

Referring to FIG. 1, a digital autopilot control panel includes a level shift input circuit 10 having input terminals 11, 12, and 13 for receiving corresponding phases a, b, c, of three wire compass step data. Outputs 14, 15, and 16 of level shift circuit 10 are coupled to corresponding inputs of counter control logic unit 18. Logic unit 18 may be comprised of a commercially available electrically programmable array logic integrated circuit chip. Such chips can be programmed by applying appropriate voltages to various terminals on the chip in accordance with a predetermined logic table. It will be appreciated that numerous types of logic arrays may be substituted for the particular integrated circuit chip described herein, although this particular chip has proven to be well suited for the intended purpose.

Heading change commands are applied by switch $\overline{L}$ and $\overline{R}$ to command a predetermined differential change in actual course heading from a set course heading to counter control 18. Clock 20 is a timing module such as Motorola Catalog No. 14541 integrated circuit chip. By selecting an appropriate resistor-capacitor combination and applying appropriate voltages to various terminals on the chip, a circuit is obtained that will yield a desired time interval. For step data comprised of unfiltered ac pulses at a 50-60 cycle rate, a corresponding clock rate of 100 Hz or 120 Hz is generated. The output $CLK_1$ of clock 20 at terminal Q is applied to the clock input of counter control 18. A reset signal $\overline{CE}_1$ is derived from counter control 18 and applied to the reset input MR of clock 20 through terminal 42 of switch $S_1$. When signal $\overline{CE}_1$ is applied to clock 20, the clock is synchronized to the step data pulses. Input MR is grounded by terminal 40 of switch $S_1$ when it is desired to receive filtered step data. Clock 20 is then allowed to run unsynchronized.

A further clock 22 is configured to provide a 3 Hz pulse $CLK_2$ from its Q output terminal. An output signal MR from counter control 18 is applied on line 24 to the reset terminal MR of clock 22 in accordance with the logic program of FIG. 5. Clock 22 is activated whenever left or right command switches $\overline{L}$ or $\overline{R}$ are activated to provide signal $CLK_2$ to counter control 18. Counter control 18 also provides a delayed timed output $CLK_3$ corresponding to a step data pulse interval, which is generated by $CLK_1$ whenever the left or right command switch is not activated.

The Q output terminal of clock 20 is connected at node 26 to logic inverter 28 to provide a degree fraction clock timing pulse $CLK_1$ corresponding to 1/6 degree increments to fraction decoder chip 30. Chip 30 is preferably an electronically programmable array logic type EP300 as described with respect to chip 18.

Counter control 18 also provides filtered step data pulses A, B, and C to fraction decoder 30. It also provides pulses C and C' to XOR gate 31 for applying clock enable pulse $CE_3$ to fraction decoder 30 on line 44. The output pulse $CE_3$ is provided to counter control 18 in accordance with logic functions described in FIG. 6.

Counters 32 and 34 are synchronous up/down binary counters which may be preset to a desired count value by applying the desired value, in binary form, to the preset inputs (not shown) and then bringing the Preset Enable (P/E) terminal high. The direction of counting is controlled by applying a logic high for incrementing the counter or a logic low for decrementing the counter to the Up/$\overline{\text{Down}}$ (U/$\overline{\text{D}}$) input. when the circuit of the least significnat digit reaches 0 (count down mode) or reaches 15 (count up mode) the $\overline{\text{Carry Out}}$ ($\overline{\text{CO}}$) terminal goes low for a complete clock cycle, thus enabling the detection of a counter empty or counter full condition to avoid overflow by generating signal $CE_2$ in decoder 30.

Pulse $CE_3$ enables $CLK_3$ to the integer counters 32 and 34 when the step data A, B, C passes through an integral degree change. Counter 32 and counter 34 are serially connected for up/down operation. The carry output $\overline{\text{CO1}}$ of integer counter 34 is coupled to the carry-in input $\overline{\text{CI}}$ of counter 32 and to fraction decoder 30. Counters 32 and 34 convert serial clock pulses $CLK_3$ received on the CLK line into a binary output which is coupled to digital-to-analog converter 36. Terminal $Q_1$ of counter 34 provides the least significant bit and terminal $Q_3$ of integer counter 32 the most significant bit of the degree integer indications to digital-to-analog converter (DAC) 36. An up/down command U/$\overline{\text{D}}$ is coupled to counters 32 and 34 from counter control 18. A parallel enable signal PE is coupled to counters 32 and 34 by gate 38 for resetting the counters to zero degree output when power is applied and the autopilot (A/P) is not enabled. Gate 38 is a NAND logic element which provides a logic low at terminal PE when a logic high is provided to both the power on and A/P enable terminals. When not enabled by gate 38, counters 32 and 34 are preset at midrange to provide a zero degree output, with output $Q_3$ of counter 32 high and outputs $Q_1$ through $Q_6$ low. When counter 34 is full, carryout terminal $\overline{\text{CO}}$ provides a signal to carry-in terminal $\overline{\text{CI}}$ of counter 32. Input $CLK_3$ to counter 34 increments or decrements the counters on transitions of an integral degree. This occurs with either a change in the step data or by pressing the left or right command control. If the counters are full or empty, signal $CE_2$ will be inhibited to prevent overranging. The conventional digital-to-analog converter 36 receives the binary degree integer data from counters 32 and 34 and the degree fraction data from decoder 30 to drive a digital display, which may be an LCD display 48. The driving signal is also provided at terminal 46 as a heading error signal to the autopilot. Differential amplifier 44 has inverting and non-inverting outputs coupled to receive the analog output of DAC36, and convert the current output thereof to a voltage suitable for driving the display 48. DAC36 receives a 12-bit input and provides an analog output which represents ±64 degree heading error with 1/6 degree increments.

Figure 2:
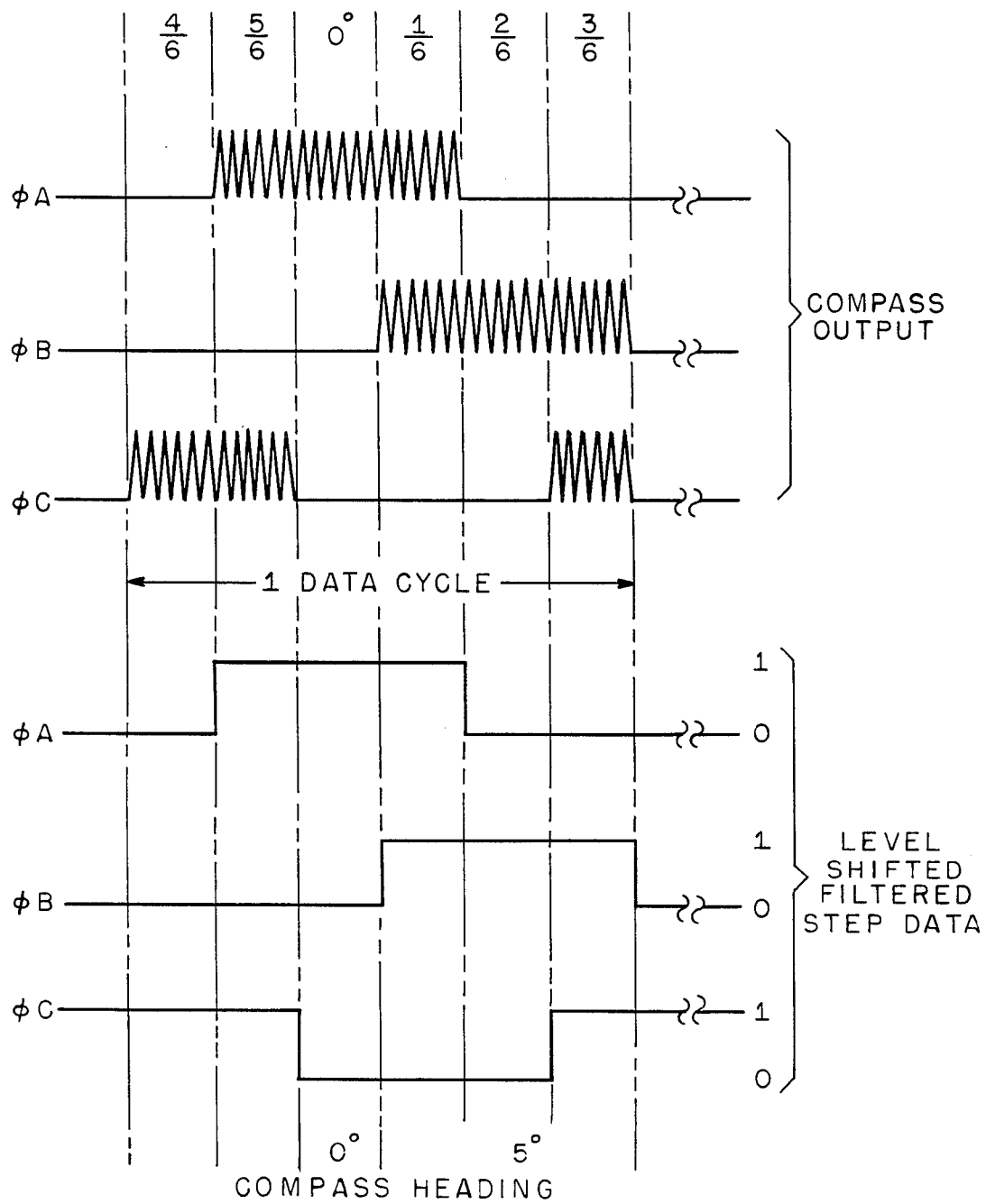
FIG. 2 is a graphical representation useful in explaining the step data signals applied to the invention.

In operation, conventional step data a, b, c from a gyrocompass (not shown) are applied to level shift circuit 10. Step data are carried by three wires 11, 12, and 13 and a common return (not shown). The applied signals a, b, and c are conventionally 35 VDC or 70 VDC and may be filtered or raw rectified AC. Typically, the AC would be supplied from a 50–60 Hz source. As the gyrocompass heading changes, a train of modulated pulses appears at each line 11, 12, and 13 to produce three phase-displaced pulse trains. As the compass heading changes, a train of modulated pulses appears at each phase output terminal, as indicated in FIG. 2. The direction in which the compass heading is changing can be determined by the sequence in which the pulses appear on the various phases. Six combinations of high and low signals occur as the compass rotates through one degree; thus the gyrocompass heading can be determined within 1/6°. The signal applied to each phase and the input logic is of the form shown in FIG. 4. It may be seen that five binary bits are sufficient to define heading changes of less than one degree to within 1/6° with minimal error. An X indicates a signal present in the corresponding phase a, b, or c. Each fractional increment of heading change is approximately 1/6°; therefore, six steps represent one degree heading change.

Input step data at 35 or 70 VDC is shifted to 5 VDC logic levels at output lines 14, 15, and 16 to produce signals a′, b′, and c′ at the input to counter control logic element 18. By providing an input voltage divider to set the turn-on level at 10–20 VDC, the input logic low signal level is 0 to 10 VDC and logic high is 20 VDC. Level shift 10 is a conventional circuit which may include an active path transistor to generate a constant drive current into an opto-isolator.

Counter control 18 may be comprised of a programmable logic array which performs the logic function shown in FIG. 5. The symbols shown in FIG. 5 are defined as follows:

$\overline{CE_1}$ is the enable signal for activating clock 20 to provide clock signal $CLK_1$. a, b, and c are the step data signals. A, B, and C represent filtered step data signals which have been processed to remove the ac ripple. C′ represents signal C delayed by 1 clock pulse duration. U/$\overline{\text{D}}$ is the up-down command signal for counters 32 and 34. MR is a reset signal. $CLK_1$ is the output of the clock 20. R and L represent the activation of the left or right heading control command switches. $CLK_2$ is the output of free running clock 22, which operates at a 3 Hz rate when gated by commands L or R. $CLK_2$ slews the counters in an appropriate direction and also generates signal $CLK_3$. $CLK_3$ is also generated by $CLK_1$ when the left or right command switch is not closed, and activates integer counters 32 and 34.

Figure 3:
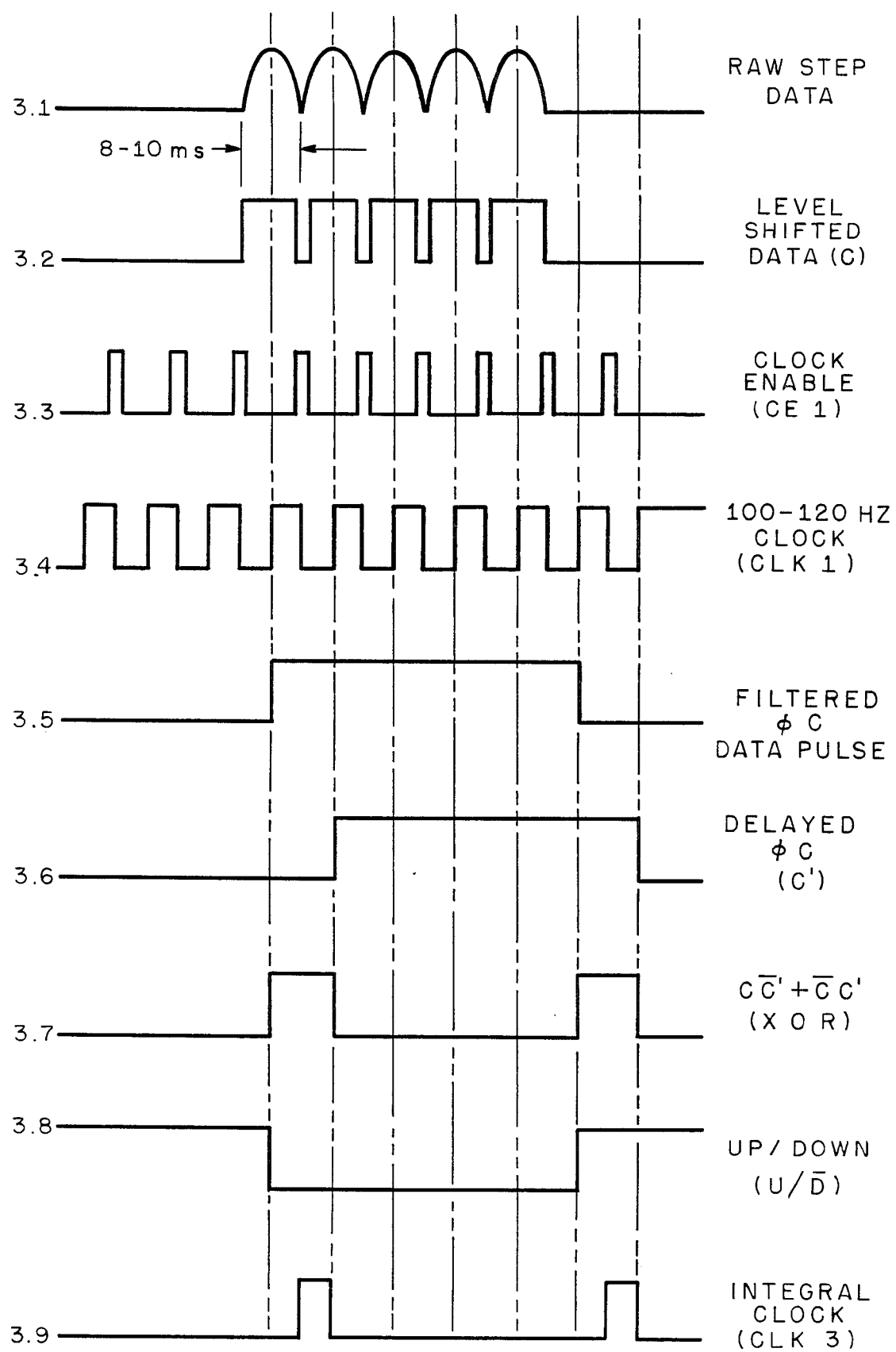
FIG. 3 is a series of graphs illustrating waveforms appearing at various points in the circuit.

Clock 20 is adapted for operation with filtered step data when switch $S_1$ makes contact with terminal 40 to ground. In that mode, clock 1 is free running at approximately 100 Hz. When switch $S_1$ is transferred to terminal 42, clock 20 will be sychronized to the step data pulses. The step data on lines 14, 15, and 16 are latched into registers in counter control 18 and read out in synchronism with clock 20. Referring to FIG. 3, waveform 3.1, the raw step data is seen to be comprised of a plurality of rectified sinusoidal pulses, each pulse being of a duration of 8–10 ms. After passing through level shift circuit 10 the pulses are essentially transformed to a rectangular waveform appearing on lines 14, 15, and 16 as shown in waveform 3.2. Clock 20, which is reset when signals a, b, and c are all low, initiates the timing cycle when a, b, or c is high and clocks the counter control 18 at the peak of the raw step data pulse. This is shown in waveform 3.4. The timeout period is preferably set for 5 ms. Because counter control 18 latches the step data, clocking will only occur when the data is valid. Thus, the ripple on the raw data is filtered out without interfering with the individual pulses constituting the data pulse train. Waveform 3.5 shows the output of line C from counter control 18 after synchronization with clock 20. Signal $\overline{CE_1}$ in FIG. 3.3 represents the reset pulse developed by complementing pulse $CE_1$. Signals C and C′ are also applied to XOR gate 31 whose output 44 (FIG. 3.7) is coupled to fraction decoder 30.

Counter control 18 will generate CLK₃ on step transitions from step 5 to step 6 or from step 6 to step 5. A logic signal U/$\overline{D}$ is generated for transitions from step 5 to step 6 so that the integer counters 32 and 34 is incremented at each one degree interval, and a logic level U/$\overline{D}$ is generated on transitions from step 6 to step 5 for decrementing the counters.

Fraction decoder 30 performs the decoding function to convert step data A, B, and C to five binary bits representing fractions of one degree whenever the level shifted step data is latched into the decoder by inverter 28. Because one step equals 1/6 degree and the least significant bit of the five binary bits equals 1/32 degree the conversion error is negligible. The logic structure of encoder 30 is shown in FIG. 6. For example, if pulses A and B but not C are present, then bits 1 and 3 will be exercized. According to FIG. 4, this denotes a heading change of 5/32°.

The binary outputs of fraction decoder 30 are applied to inputs 1-5 of digital-to-analog converter 36. Input 1 denotes the least significant bit (LSB). Decoder 30 also generates signals CE₂ and CE₃, from the logic shown in FIG. 6, whose function is as described above. Signal $\overline{CO1}$ generated when integer counter 34 is full or empty, and bit signals Q₁, Q₂, and Q₃ from integer counter 32, are applied to decoder 30 to provide the logic functions shown in FIG. 6. These signals constitute an end of count (EOC) signal to stop signal CLK₃ when the integer counters are full or empty, thus preventing overflow.

Pulses clocked out of counter control 18 by signal CLK₃ are applied to integer counters 32 and 34. Counters 32 and 34 are basically conventional up/down counters connected in series to count in a direction determined by the instantaneous value of the up/down control signal received from counter control 18 when the left or right heading change command switches are closed. Outputs Q₁-Q₄ of counter 34 and Q₁-Q₃ of counter 32 constitute a total of seven binary bits with the LSB representing one degree heading error. Thus, 12 bits total are generated from decoder 30 and counters 32 and 34 and coupled to DAC₃₆. The up/down count command is shown in waveform 3.8 of FIG. 3. The corresponding integer clock pulse, CLK₃, is shown in waveform 3.9.

Waveform 3.7 represents the output of exclusive OR gate 31.

In general, counter control 18 serves to generate a clock pulse CLK₃ to trigger counters 32 or 34 each time that the gyrocompass heading passes through an integral degree reading. The seven bit counter keeps track of the number of degrees of net change in compass heading since the previous reading. NAND gate 38 provides a parallel enable signal PE to load the counters to mid range when the auxiliary autopilot console is not selected or after a power interruption. Thus, in operation, the count up or down is always made from an initial reading of zero permitting a count range of ±64 degrees.

DAC 36 is a conventional integrated circuit such as National Semiconductor 1265ACJ which accepts binary bit data on terminals 1-12 and converts this data to analog form. Inverter 44 accepts the current output of DAC 36 and converts it to a signal voltage at node 46 which is coupled to drive a conventional analog-to-digital display for providing an output in degrees heading error in integral and fractional degrees. Display 48 may be of the LCD type, such as Intersil ICL7136. The analog signal at node 46 is also coupled to provide an indication of autopilot heading error to the gyrocompass.

It may be seen that with neither the left nor right command switches activated, step data signals a, b and c will be coupled through level shift circuit 10 to counter control 18 and fraction decoder 30 to provide a binary signal representing fractions of a degree in 1/6 degree increments. Counters 32 and 34 will be initialized to provide a zero count upon power up and enablement of the auxiliary autopilot. As the step data signals are incremented with change in the gyrocompass output, signal CLK₃ will be generated by CLK₁. When the compass heading change is slightly greater than 0 degrees, outputs will be produced in phase A and phase B, whereas no voltage will appear in phase C. As the compass heading moves below 0 degrees, the phase C voltage rises to a high level while phase B moves to a low level and a high level then is produced in both phases A and C. By detecting the change in phase C information, the up/down counter function is activated, so that integer counters 32 and 34 will provide binary outputs to DAC 36 representing error or heading changes of ±64° in one degree steps. Fraction decoder 30 responds to changes in the step data in a similar manner to provide heading error or heading change of 0 to 1 degree in 1/6 degree steps.

When a left or right command control switch is activated, signal CLK₂ is generated which generates signal CLK₃ and causes counters 32 and 34 to slew up or down in accordance with the up/down signal. Fraction decoder 30 receives signals CLK₁, A, B, C, and C′ from counter control 18 and signals CO1, Q1, Q2, and Q3 from integer counter 32 and provides outputs CE2, CE3, and binary bits 8-12 according to the logic functions of FIG. 6. Signal CE2 enables signal CLK₃ when the counters are not full or empty. Signal CE3 enables the counters when the step data passes through step zero (integer change). Bits 1-5 represent fractions of a degree and are logic inputs to the DAC 36. Integer logic inputs to the DAC 6 come from counters 32 and 34 and are represented by bits 6-12. Thus, the counter slews up or down in response to either a change in step data or by pressing the left or right command switch to provide integer inputs to the DAC 36, and the step data is decoded by decoder 30 to provide fractions of a degree input to the DAC. DAC 36 converts the logic inputs to an analog output which represents heading error or heading change of ±64 degrees in 1/6 degree steps. Digital display 48 is used to convert the analog heading error signal to a digital output for driving an LCD display to indicate the amount of heading change ordered when changing course.

It may be seen, therefore, that the autopilot control panel has the following advantages over the prior art:
1. It requires no moving parts such as motor, gears, clutch or potentiometer.
2. It provides a digital readout capable of reading fractions of a degree with high accuracy.
3. It offers high reliability with reduced cost as compared to mechanical devices.
4. It is adaptable to fit in the space of an existing autopilot control panel with minimal cost.
5. Extensive software programming is not required as would be mandated by a microprocessor controller.
6. All components are essentially off-the-shelf integrated circuits.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A heading change controller for a marine vessel having an autopilot for commanding a set course heading and including a gyrocompass, display means for displaying a heading error relative to the set course heading and command means for commanding a differential change in actual course heading comprising:
    (a) level shift means coupled to receive step data signals from said gyrocompass at a first predetermined voltage level for providing output step data signals at a second predetermined voltage level;
    (b) first logic means coupled to said level shift means for converting said output step data signals to first binary signals and responsive to signals from said command means for providing pulse signals representative of course deviations;
    (c) second logic means coupled to said first logic means to receive said first binary signals for generating second binary signals representative of magnitude and direction of fractional degree deviations from a set course heading;
    (d) means coupled to said first logic means and responsive to said pulse signals for generating third binary signals representative of magnitude and direction of integer degree deviations from said set course heading;
    (e) DAC means coupled to receive said second binary signals from said second logic means and said third binary signals from said integer degree deviation means for converting said second and third binary signals to analog signals representative of course deviations; and
    (f) means for coupling said analog signals to said display means to provide a visual digital readout of command direction and heading error in integer degrees and fractions of a degree.

2. Apparatus as in the claim 1 further comprising first clock generation means responsive to said step data signals for providing clock signals to said first logic means synchronized with said step data signals, said synchronized clocked signals utilized by said first logic means to provide said output step data signals without ripple thereon.

3. Apparatus as in claim 2 further comprising second clock generation means responsive to said command means for generating signals coupled to and utilized by said first logic means for providing said pulse signals to said third binary signal generating means.

4. Apparatus as in claim 3 further comprising inverter means coupled between said first clock generation means and said second logic means for providing timing signals to said second logic means.

* * * * *